United States Patent
Yamamoto (10) Patent No.: US 10,402,006 B2
(45) Date of Patent: Sep. 3, 2019

(54) INFORMATION PROCESSING APPARATUS, OPERATION DETERMINATION METHOD, AND STORAGE MEDIUM

(71) Applicant: CANON KABUSHIKI KAISHA, Tokyo (JP)

(72) Inventor: Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 15/342,512

(22) Filed: Nov. 3, 2016

(65) Prior Publication Data

US 2017/0131831 A1 May 11, 2017

(30) Foreign Application Priority Data

Nov. 10, 2015 (JP) .................................. 2015-220567

(51) Int. Cl.
*G06F 3/041* (2006.01)
*G06F 3/0484* (2013.01)
*G06F 3/0488* (2013.01)
*G06F 3/0485* (2013.01)

(52) U.S. Cl.
CPC .......... *G06F 3/0416* (2013.01); *G06F 3/0485* (2013.01); *G06F 3/04845* (2013.01); *G06F 3/04883* (2013.01)

(58) Field of Classification Search
CPC .. G06F 3/0416; G06F 3/04845; G06F 3/0485; G06F 3/04883
See application file for complete search history.

(56) References Cited

U.S. PATENT DOCUMENTS

| 8,972,889 B2* | 3/2015 | Mizuura | G06F 3/04883 715/800 |
| 2014/0380247 A1* | 12/2014 | Tecarro | G06F 3/0483 715/863 |
| 2016/0147378 A1* | 5/2016 | Kisara | G06F 3/04883 345/173 |
| 2016/0357375 A1* | 12/2016 | Klaver | G06F 3/04886 |

FOREIGN PATENT DOCUMENTS

| JP | 2013-200882 A | 10/2013 |
| JP | 2015172836 A | 10/2015 |

OTHER PUBLICATIONS

Japanese Office Action issued in corresponding Japanese Application No. 2015-220567 dated Jun. 25, 2019.

* cited by examiner

*Primary Examiner* — Afroza Chowdhury
(74) *Attorney, Agent, or Firm* — Venable LLP (57) ABSTRACT

An information processing apparatus includes a touch sensor configured to detect a touch position on an input surface touched with a pointer. The information processing apparatus is configured to receive, depending on whether or not a linear locus of the touch position on the input surface starts from inside an operation start region set on the input surface, the linear locus of the touch position as any one of a first operation and a second operation different from the first operation on an image that is displayed on a predetermined display. The operation start region is determined based on at least one of an operation status of the pointer and a display state of the image.

20 Claims, 7 Drawing Sheets

| DETERMINATION ITEM | CONDITION | PROCESSING | PRIORITY |
|---|---|---|---|
| PERIOD SINCE IMAGE TRANSITION | 1 SECOND OR LESS | SET AREA LARGER | 1 |
| SCROLLABLE AMOUNT | SEAMLESS | SET AREA LARGER AS SCROLLABLE AMOUNT BECOMES SMALLER | 4 |
| PERIOD SINCE SCROLLING | 1 SECOND OR LESS | SET AREA SMALLER | 2 |
| NON-OPERATION PERIOD | PERIOD CORRESPONDING TO INFORMATION QUANTITY OF CONTENT OF MORE | SET AREA SMALLER | 3 |

FIG. 7A

| DETERMINATION ITEM | CONDITION | PROCESSING | WEIGHT | CHANGE AMOUNT [dot] |
|---|---|---|---|---|
| PERIOD SINCE IMAGE TRANSITION | 1 SECOND OR LESS | SET AREA LARGER | 4 | 20 |
| SCROLLABLE AMOUNT | SEAMLESS | SET AREA LARGER AS SCROLLABLE AMOUNT BECOMES SMALLER | 2 | SEAMLESS |
| PERIOD SINCE SCROLLING | 1 SECOND OR LESS | SET AREA SMALLER | 4 | 20 |
| NON-OPERATION PERIOD | PERIOD CORRESPONDING TO INFORMATION QUANTITY OF CONTENT OF MORE | SET AREA SMALLER | 1 | 20 |

FIG. 7B

INFORMATION PROCESSING APPARATUS, OPERATION DETERMINATION METHOD, AND STORAGE MEDIUM

BACKGROUND OF THE INVENTION

Field of the Invention

The present invention relates to an information processing apparatus, an operation determination method, and a storage medium for using a touch interface as its user interface.

Description of the Related Art

A touch panel, which is a combination of a display and a touch sensor configured to detect a touch position, is often used as a touch interface that enables a user to perform a touch operation by directly touching an input surface with, for example, a finger or a stylus pen (hereinafter referred to as "pointer"). In some cases, the size of an execution screen of application software displayed on a display is larger than that of a display screen of the display. In such cases, there is provided, as a general function, a function of scrolling the execution screen by the user moving a pointer in a sliding manner on the input surface of the touch sensor. The operation of moving a pointer in a sliding manner on the input surface of the touch sensor is referred to as "swiping".

In Japanese Patent Application Laid-open No. 2013-200882, there is disclosed an information processing apparatus for performing a predetermined operation by detecting swiping that starts from a specific region, which is set at an end portion of a display screen, toward an inner side of the display screen. In this specification, swiping that starts from the specific region, which is set at an end portion of a display screen, toward an inner side of the display screen is referred to as "edge swiping". Further, the specific region is referred to as "operation start region".

In order to widely scroll the execution screen of application software displayed on a display, the movement distance of the pointer needs to be increased at the time of swiping. However, a device in which edge swiping is associated with an operation different from the instruction of scrolling may determine an operation of starting swiping from the end portion of the display screen with an increased movement distance of the pointer as edge swiping (operation different from the instruction of scrolling). When the operation start region is set smaller to avoid determination of edge swiping, edge swiping cannot be performed easily. Therefore, there is a demand for an information processing apparatus that has improved operability of a touch operation by clearly distinguishing between normal swiping and edge swiping.

SUMMARY OF THE INVENTION

According to one embodiment of the present invention, there is provided an information processing apparatus, including: a position detection unit configured to detect a touch position on an input surface touched with a predetermined pointer; a region determination unit configured to determine the predetermined region based on at least one of an operation status of the predetermined pointer and a display state of the image; and a reception unit configured to receive, depending on whether or not a linear locus of the touch position on the input surface starts from inside a predetermined region set on the input surface, the linear locus of the touch position as any one of a first operation and a second operation different from the first operation on an image that is displayed on a predetermined display.

Further features of the present invention will become apparent from the following description of exemplary embodiments (with reference to the attached drawings).

DESCRIPTION OF THE EMBODIMENTS

Now, an embodiment of the present invention is described in detail with reference to the drawings. Note that, components described in this embodiment are merely exemplary components, and are not intended to limit the scope of the present invention to those components.

Figure 1A:
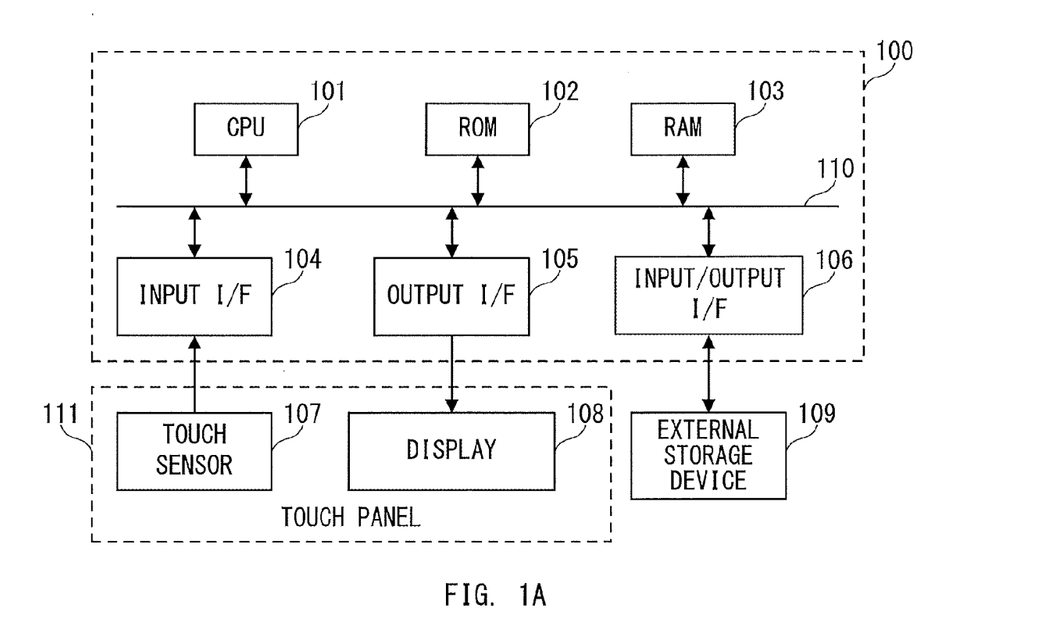
FIG. 1A and FIG. 1B are explanatory diagrams for illustrating an information processing apparatus.
Figure 1B:
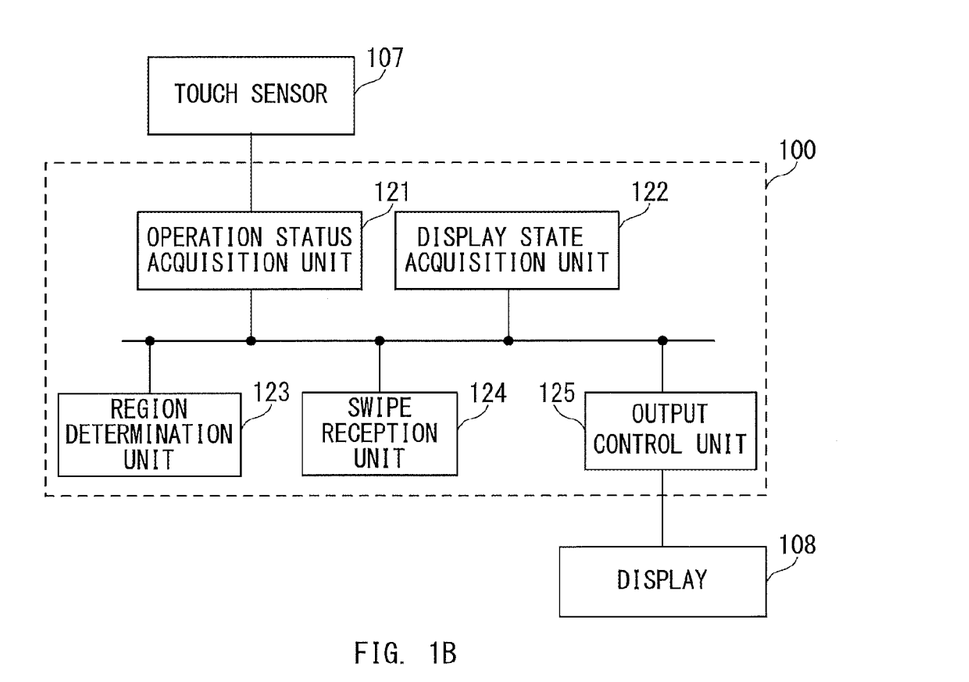

An information processing apparatus of this embodiment is configured to determine the size of an operation start region from which an operation is started with a pointer such as a finger or a stylus pen at the time of edge swiping, at least based on an operation status of a user or a display state of an image displayed on a display screen. "Swiping" in this embodiment refers to an operation of moving a finger on a touch detection region in a manner of sliding in a uniform direction. "Edge swiping" is a name particularly used for distinguishing between swiping from an operation start region, which is defined at an end portion of a display screen, toward an inner side of the display screen and swiping from outside the operation start region toward an arbitrary direction. In general, edge swiping is often used in association with processing of returning to a previous image or a previous tab when swiping is performed from inside the operation start region placed at a left end portion of the screen. FIG. 1A and FIG. 1B are each an explanatory diagram for illustrating an information processing apparatus for executing such processing.

FIG. 1A is a hardware configuration diagram for illustrating an information processing apparatus 100. The information processing apparatus 100 includes a central processing unit (CPU) 101, a read only memory (ROM) 102, and a random access memory (RAM) 103. A touch sensor 107, a display 108, and an external storage device 109 are connected to the information processing apparatus 100. For this reason, the information processing apparatus 100 includes an input interface (I/F) 104, an output interface (I/F) 105, and an input/output interface (I/F) 106. The CPU 101, the ROM 102, the RAM 103, the input I/F 104, the output I/F 105, and the input/output I/F 106 are connected to one another for communication via a system bus 110.

The CPU 101 is configured to read a computer program for controlling an operation of the information processing apparatus 100 from at least one of the ROM 102 and the external storage device 109, and to execute the program using the RAM 103 as a work area. Through this processing, the CPU 101 executes various processing by the information processing apparatus 100. In addition to the work area, the RAM 103 provides an area for saving data at the time of error handling and an area for loading a computer program.

The input/output I/F 106 is an interface between the information processing apparatus 100 and the external storage device 109, and is configured to read a computer program stored in, for example, the external storage device 109 and store data in the external storage device 109. The external storage device 109 is, for example, a hard disk drive (HDD) or a solid state drive (SDD). Further, the external storage device 109 can be implemented by, for example, a medium (storage medium) and an external storage drive for allowing access to the medium. A flexible disk (FD), a CD-ROM, a DVD, a USB memory, an MO, and a flash memory are known as examples of such a medium. Further, the external storage device 109 may be, for example, a server device connected to the information processing apparatus 100 via a network. In this embodiment, necessary information is held in the RAM 103 or the external storage device 109.

The input I/F 104 is an interface configured to acquire data indicating a touch operation by the user on the touch sensor 107 serving as an input device, and to input the data into the CPU 101. The touch sensor 107 is a position detection device including an input surface on which a touch operation is performed with a pointer, which is configured to detect a touch position on the input surface touched with the pointer and transmit the touch position to the information processing apparatus 100 together with the detection time. The touch sensor 107 is implemented as, for example, a resistive touch sensor, a capacitive touch sensor, an infrared touch sensor, an ultrasonic touch sensor, an acoustic touch sensor, or a dispersive signal touch sensor. In other cases, the touch sensor 107 may be a device capable of detecting a position in a three dimensional space, such as a distance image sensor or a stereo camera, and configured to detect whether or not the pointer has touched the input surface and acquire the touch position on the input surface.

The output I/F 105 is an interface configured to transmit, to the display 108 serving as an output device, data representing an image to be displayed on the display 108. The display 108 is configured to display an image corresponding to the data acquired from the output I/F 105. The image to be displayed on the display 108 is, for example, an execution result of various types of processing executed by the information processing apparatus 100. The display 108 is implemented as, for example, a liquid crystal display, a television monitor, or a projector.

In this embodiment, a touch panel 111 is used, which is constructed by superimposing the capacitive touch sensor 107 that is a transparent sheet on the display screen of the display 108. The surface of the touch sensor 107 placed on the display screen of the display 108 serves as the input surface. The touch sensor 107 and the display 108 may be integrated to be used as a display with a built-in touch sensor. In this embodiment, the touch panel 111 is configured to detect a surface region on which the pointer and the surface (input surface) of the touch panel 111 are in contact with each other, and to identify coordinates of one point within the surface region as a touch position for input to the information processing apparatus 100.

FIG. 1B is a functional block diagram for illustrating the information processing apparatus 100. In this embodiment, the information processing apparatus 100 implements functions of FIG. 1B by the CPU 101 executing a computer program. FIG. 1B is an illustration of functions for distinguishing between swiping and edge swiping. The information processing apparatus 100 functions as an operation status acquisition unit 121, a display state acquisition unit 122, a region determination unit 123, a swipe reception unit 124, and an output control unit 125. Each of the functions may be implemented at least in part by hardware.

The operation status acquisition unit 121 is configured to acquire operation status information representing a status of an operation performed by the user with the pointer on the input surface based on the data acquired from the touch sensor 107 via the input I/F 104. The operation status acquisition unit 121 acquires data at a predetermined time interval from the touch sensor 107. The data acquired by the operation status acquisition unit 121 at least contains the touch position of the pointer and a detection time of the touch position. When the pointer is away from the input surface, the touch sensor 107 outputs data indicating that the touch position is not detected. On the basis of the data acquired from the touch sensor 107 at a predetermined time interval, the operation status acquisition unit 121 acquires, as the operation status information, movement of the pointer on the input surface from the start of the touch operation to the end thereof, a period of time since the touch operation has been completed, a period of time during which an operation is not performed (non-operation period), and other kinds of information.

The display state acquisition unit 122 is configured to acquire display state information representing a display state of an image displayed on the display 108. For example, an image of a part of the execution screen of application software is displayed on the display 108. On the basis of the image displayed on the display 108, the display state acquisition unit 122 acquires, as the display state information, a period of time during which a new image is displayed after transition of images, a scrollable amount, an information quantity of content contained in a displayed image, and other kinds of information. The display state acquisition unit 122 acquires those kinds of display state information based on, for example, data for displaying an image on the display 108.

The region determination unit 123 is configured to determine an operation start region based on at least one of the operation status information acquired by the operation status acquisition unit 121 and the display state information acquired by the display state acquisition unit 122. As described later, the information processing apparatus 100 determines swiping whose start position is located within the operation start region as edge swiping. The operation start region has a defined reference region whose size, shape, and position are used as a reference. The region determination unit 123 determines the size, shape, and position of the operation start region based on the operation status information, the display state information, and the reference region. For example, when at least one of the operation status information and the display state information satisfies a predetermined condition, the region determination unit 123 changes at least one of the size, shape, and position of the reference region to determine the operation start region, and when the condition is no longer satisfied, returns the operation start region to the reference region. Further, the region determination unit 123 may hold data defining the size, shape, and position of the operation start region for each combination of the operation status information and the display state information, and determine the operation start region based on the held data corresponding to the acquired operation status information and display state information. In this case, the reference region is unnecessary.

In the case of determining the operation start region based on the operation status information, for example, when a period of time since the user has scrolled an image is equal to or less than a predetermined period of time, the region determination unit 123 sets the operation start region smaller than the reference region. Accordingly, swiping is determined for a larger region, whereas edge swiping is determined for a smaller region. Through a reduction of the operation start region, swiping is less likely to be determined as edge swiping. Thus, for example, the user can easily scroll an image continuously in the same direction, or readily scroll an image back in the opposite direction when the user has scrolled the image more than necessary.

In the case of determining the operation start region based on the display state information, for example, when a period of time since an image displayed on the display 108 has transitioned to a new image for display is equal to or less than a predetermined period of time, the region determination unit 123 sets the operation start region larger than the reference region. Accordingly, swiping is determined for a smaller region, whereas edge swiping is determined for a larger region. Through the increase of the operation start region, swiping is more likely to be determined as edge swiping. Thus, for example, the user can easily return to the previous image immediately after the image has transitioned.

In the case of determining the operation start region based on the operation status information and the display state information, for example, the region determination unit 123 calculates a period of time necessary for the user to understand content based on the information quantity of the content contained in the display state information. When the non-operation period contained in the operation status information is more than the period of time necessary for the user to understand the content, the region determination unit 123 sets the operation start region smaller than the reference region. Accordingly, swiping is determined for a larger region, whereas edge swiping is determined for a smaller region. Through reduction of the operation start region, swiping is less likely to be determined as edge swiping. Thus, for example, after understanding the content, the user can easily scroll the image to move to the next content.

The swipe reception unit 124 is configured to receive a linear locus of the touch position on the input surface formed by the pointer as a touch operation. For example, the swipe reception unit 124 determines a touch operation, which corresponds to a linear locus of the touch position on the input surface formed by the pointer starting from inside the operation start region and extending toward the inner side of the input surface for a predetermined distance or more, as edge swiping for a reception. Further, the swipe reception unit 124 determines a touch operation, which corresponds to a linear locus of the touch position on the input surface formed by the pointer starting from outside the operation start region and extending for a predetermined distance or more, as swiping for reception. In this embodiment, the operation start region may be arranged on each of top, bottom, left, and right end portions of the input surface. The arrangement position is not limited to the four top, bottom, left, and right end portions of the input surface, and may be a part thereof. When the locus of the touch position formed by the pointer does not extend for the predetermined distance or more, the information processing apparatus 100 determines that another touch operation such as tapping or holding down is performed.

The output control unit 125 is configured to transmit data for displaying an image to the display 108. The display 108 is configured to display an image corresponding to the data. For example, the output control unit 125 causes the display 108 to display an image corresponding to the touch position of the pointer. When the swipe reception unit 124 determines the touch operation as edge swiping, the output control unit 125 causes the display 108 to display an image corresponding to the position of edge swiping.

For example, when the swipe reception unit 124 determines the touch operation as edge swiping starting from the left end portion of the input surface toward the inner side, the output control unit 125 causes the display 108 to display an image that has been displayed until just before. In this manner, the user can return to the previous display of an image. When the swipe reception unit 124 determines the touch operation as swiping, the output control unit 125 causes the display 108 to display an image that follows the touch position of the pointer. In this manner, it is possible to scroll an image in accordance with the touch position. When another touch operation other than swiping or edge swiping is performed, the output control unit 125 causes the display 108 to display an image corresponding to the another touch operation.

The information processing apparatus 100 as configured above can be implemented by a device including a touch interface, such as a smartphone, a tablet terminal, or a personal computer including a touch panel.

Figure 2:
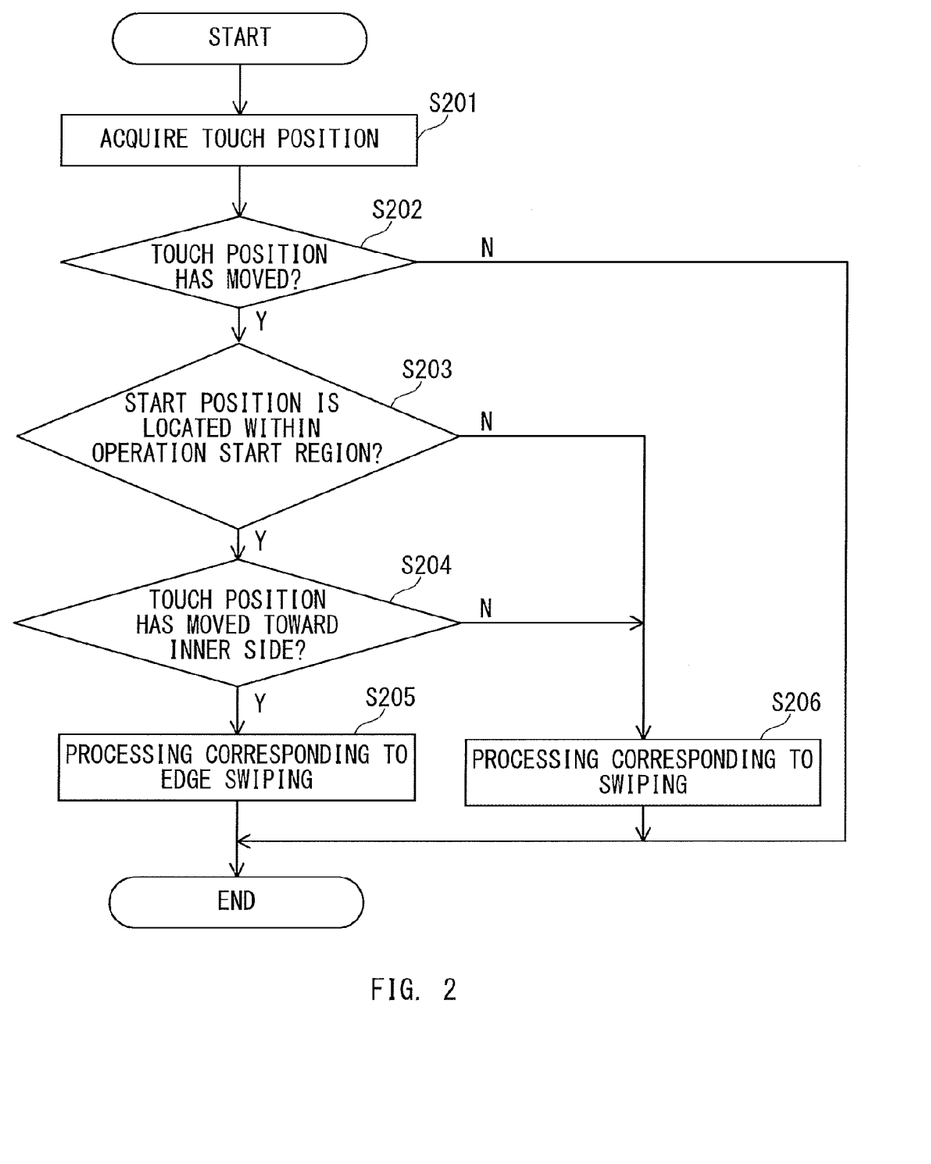
FIG. 2 is a flowchart for illustrating touch operation determination processing.

FIG. 2 is a flowchart for illustrating touch operation determination processing performed by the information processing apparatus 100. The information processing apparatus 100 determines a touch operation as any one of edge swiping, swiping, and another operation through this processing. The information processing apparatus 100 performs this processing in response to data acquisition from the touch sensor 107. The information processing apparatus 100 acquires data from the touch sensor 107 at a fixed time interval. The data acquired from the touch sensor 107 represents the position (touch position) on the input surface of the touch sensor 107 touched by the user with a pointer or represents that the touch position is not detected.

The operation status acquisition unit 121 acquires the touch position on the input surface of the pointer based on the data acquired from the touch sensor 107 (Step S201). When the data acquired from the touch sensor 107 represents that the touch position is not detected, the operation status acquisition unit 121 acquires information representing that the pointer is not touching the input surface.

The operation status acquisition unit 121 determines whether or not the acquired touch position has moved (Step S202). The operation status acquisition unit 121 has acquired data from the touch sensor 107 at a fixed time interval, and thus determines whether or not the touch position has moved based on a difference between the touch position that is based on the previously acquired data and the current touch position. For example, when the difference in touch position is a predetermined threshold value or more, the operation status acquisition unit 121 determines that the touch position has moved. When the touch position has not moved (Step S202: N), the information processing apparatus 100 determines the current touch operation as neither one of edge swiping nor swiping, to end this processing.

When the touch position has moved (Step S202: Y), the swipe reception unit 124 determines whether or not the touch position at the time when the touch operation has started is located within the operation start region (Step S203). The swipe reception unit 124 holds the touch position at the time when the touch operation has started. The swipe reception unit 124 performs this determination based on the held touch position.

When the touch position at the time when the touch operation has started is located within the operation start region (Step S203: Y), the swipe reception unit 124 determines whether or not the touch position has moved toward the inner side of the input surface (Step S204). The swipe reception unit 124 determines whether or not the touch position has moved toward the inner side of the input surface based on the touch position at the time when the touch operation has started and the currently acquired touch position.

When the touch position has moved toward the inner side of the input surface (Step S204: Y), the swipe reception unit 124 determines the touch operation as edge swiping. In this case, the output control unit 125 causes the display 108 to display an image that is based on edge swiping (Step S205). For example, when the touch operation is edge swiping starting from the left end portion of the input surface toward the inner side, the output control unit 125 causes the display 108 to display the previously displayed image.

When the touch position at the time when the touch operation has started is not located in the operation start region (Step S203: N), or when the touch position has not moved toward the inner side of the input surface (Step S204: N), the swipe reception unit 124 determines the touch operation as swiping. In this case, the output control unit 125 causes the display 108 to display an image that is based on swiping (Step S206). For example, when the touch operation is swiping from left to right on the input surface, the output control unit 125 causes the display 108 to display an image in such a manner that an image that has been displayed is moved toward the right direction.

Through the processing described above, the information processing apparatus 100 determines the touch operation as any one of edge swiping, swiping, and another operation, and causes the display 108 to display an image corresponding to the specifics of operation. The threshold value for determining whether or not the touch position has moved in Step S202 may be set to a different value depending on whether the touch operation is edge swiping or swiping. In this case, the information processing apparatus 100 determines whether or not the touch position at the time when the touch operation has started is located within the operation start region before determining whether or not the touch position has moved. In other words, the information processing apparatus 100 performs the processing of Step S203 before the processing of Step S202. The operation status acquisition unit 121 holds two threshold values, and performs the processing of Step S202 using any one of those values depending on the processing result of Step S203.

FIG. 3 and FIG. 4A to FIG. 4D are flowcharts each for illustrating processing of determining the operation start region. As described above, the region determination unit 123 determines the operation start region based on at least one of the operation status information and the display state information. For this reason, the information processing apparatus 100 acquires the operation status information with the operation status acquisition unit 121 (Step S301), and acquires the display state information with the display state acquisition unit 122 (Step S302). The region determination unit 123 sets the operation start region based on at least one of the operation status information and the display state information (Step S303). When the region determination unit 123 determines the operation start region based on the operation status information, the processing of Step S302 may not be performed. When the region determination unit 123 determines the operation start region based on the display state information, the processing of Step S301 may not be performed.

Figure 4A:
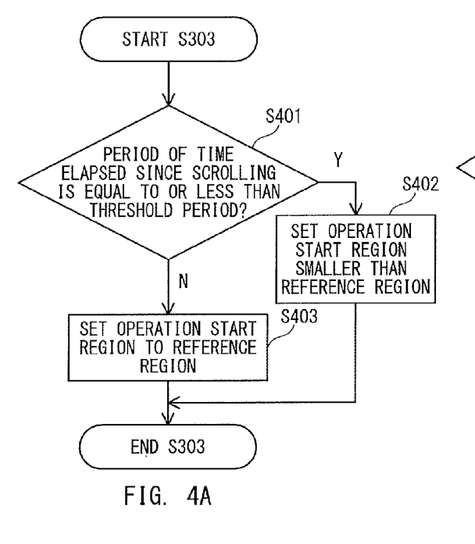
FIG. 4A, FIG. 4B, FIG. 4C, and FIG. 4D are flowcharts for illustrating processing of determining the operation start region.

When the user performs swiping within a period immediately after scrolling an image, in many cases, the user scrolls the image again in the same direction as before or scrolls the image to return to the previous display, rather than performing edge swiping. In this context, "period immediately after scrolling an image" means a period of time that is too short for the user to fully understand the content of an image (for example, read text) displayed as a result of the scrolling. When the user performs swiping again in this period, it can be considered that the scroll amount is more likely to be slightly adjusted compared to the possibility of the user having understood the content displayed as a result of the scrolling and starting the next operation. In short, immediately after the user performs swiping to scroll an image, swiping is more likely to be performed again than edge swiping. In the following, the operation start region is determined based on this assumption. FIG. 4A is a flowchart for illustrating processing of determining the operation start region when the user performs swiping to scroll an image.

Figure 3:
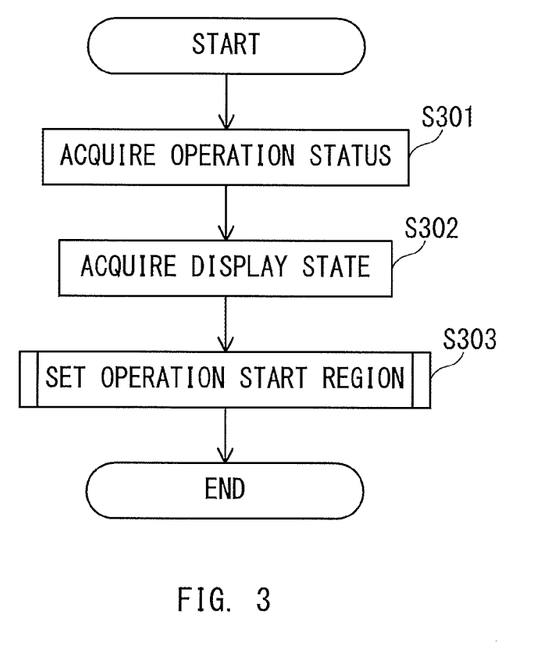
FIG. 3 is a flowchart for illustrating processing of determining an operation start region.

In this case, in the processing of FIG. 3, the operation status acquisition unit 121 acquires a period of time since the user has performed swiping to scroll an image as the operation status information (Step S301). For example, the operation status acquisition unit 121 holds a time at which the pointer used to perform swiping to scroll an image is away from the input surface, and acquires a period of time elapsed since the time. The display state acquisition unit 122 does not need to acquire the display state information.

The region determination unit 123 determines whether or not the period of time elapsed since the user has scrolled an image is equal to or less than a predetermined threshold period based on the operation status information acquired by the operation status acquisition unit 121 (Step S401). When the period of time is equal to or less than the threshold period (Step S401: Y), the region determination unit 123 sets the operation start region smaller than the reference region (Step S402). For example, the region determination unit 123 sets the operation start region such that a perpendicular distance from the end of the input surface is shorter than that of the reference region. The region determination unit 123 may prepare a region smaller than the reference region as the operation start region in advance. In other cases, the region determination unit 123 may dynamically deform the reference region depending on the period of time elapsed since the user has scrolled an image, to thereby set the operation start region. For example, the region determination unit 123 sets the operation start region smaller as the period of time elapsed since the user has scrolled an image becomes shorter. The region determination unit 123 may hold a table defining the operation start region whose size is different depending on the period of time elapsed since the user has scrolled an image, or may calculate the perpendicular distance from the end of the input surface depending on the elapsed period of time, to set the operation start region. Further, the region determination unit 123 may deform the shape of the operation start region. For example, swiping from left to right is performed near the center of the input surface in the longitudinal direction in many cases, and thus the region determination unit 123 may deform the shape of the operation start region such that the distance from the end of the input surface becomes significantly shorter near the center of the left end region in the longitudinal direction.

When the period of time elapsed since the user has scrolled an image is not equal to or less than the predetermined threshold period (Step S401: N), the region determination unit 123 sets the operation start region to the reference region (Step S403).

Figure 4B:
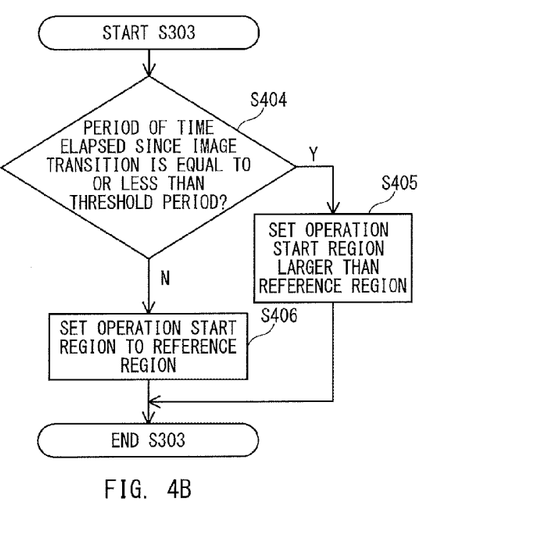

Next, FIG. 4B is a flowchart for illustrating processing of determining the operation start region when the user performs swiping before understanding the content in a period immediately after image transition. "Image transition" in this embodiment means transition of content displayed on the screen from one application window to another application window. "Image transition" does not include the case of the content displayed on the screen moving in a sliding manner by scrolling. In this context, "period immediately after image transition" means a period of time that is too short for the user to fully understand the content of an image (for example, read text) displayed as a result of the image transition. When the user performs swiping again in this period, the information processing apparatus 100 can determine that the user is highly likely to find that the content displayed as a result of the image transition differs from the original intention before understanding the content and try to return to the previous image. In short, immediately after the user instructs image transition, edge swiping is more likely to be performed than swiping for scrolling an image. In such a case, in this embodiment, the information processing apparatus 100 sets the operation start region so that the user's operation is more likely to be determined as an operation for returning to the previous image, that is, so as to facilitate edge swiping.

In this case, in the processing of FIG. 3, the operation status acquisition unit 121 does not need to acquire the operation status information. The display state acquisition unit 122 acquires a period of time elapsed since the image has transitioned as the display state information (Step S302). For example, the display state acquisition unit 122 holds a time at which data of an image after the image transition is output to the display 108, and acquires a period of time elapsed from that time to the current time.

The region determination unit 123 determines whether or not the elapsed period of time acquired by the display state acquisition unit 122 is equal to or less than a predetermined threshold period (Step S404). When the period of time is equal to or less than the threshold period (Step S404: Y), the region determination unit 123 sets the operation start region larger than the reference region (Step S405). For example, the region determination unit 123 sets the operation start region such that the perpendicular distance from the end of the input surface is longer than that of the reference region. The region determination unit 123 may prepare a region larger than the reference region as the operation start region in advance. In other cases, the region determination unit 123 may dynamically deform the reference region depending on the period of time elapsed since the image has transitioned, to thereby set the operation start region. For example, the region determination unit 123 sets the operation start region larger as the period of time elapsed since the image has transitioned becomes shorter. Further, the region determination unit 123 may deform the shape of the operation start region such that the distance from the end of the input surface becomes significantly longer near the center of the left end region of the reference region in the longitudinal direction.

When the period of time elapsed since the image has transitioned is not equal to or less than the predetermined threshold period (Step S404: N), the region determination unit 123 sets the operation start region to the reference region (Step S406).

Figure 4C:
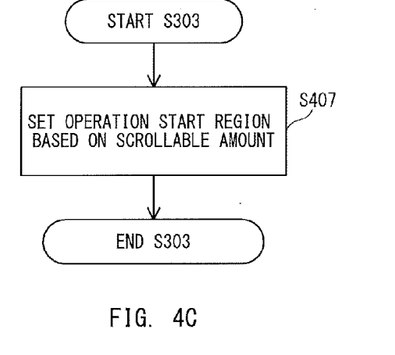

FIG. 4C is a flowchart for illustrating processing of determining the operation start region based on a scrollable amount of a displayed image.

In this case, in the processing of FIG. 3, the operation status acquisition unit 121 does not need to acquire the operation status information. The display state acquisition unit 122 acquires the scrollable amount of the displayed image as the display state information (Step S302). For example, the display state acquisition unit 122 acquires a scrollable amount of "0" as the display state information when the image is an unscrollable image or when the image is scrolled to the maximum extent possible and cannot be scrolled any more. As the scrollable amount becomes larger, the display state acquisition unit 122 sets the scrollable amount in the display state information to a larger value. The scrollable amount is represented by, for example, a distance necessary to reach the scroll limit when the user actually scrolls an image. Further, the scrollable amount is acquired for each of top, bottom, left, and right directions, and for example, the scrollable amount for the right direction is used to determine the operation start region of the left end portion of the input surface.

The region determination unit 123 sets the operation start region based on the scrollable amount acquired by the display state acquisition unit 122 (Step S407). For example, the region determination unit 123 sets the operation start region larger as the scrollable amount becomes smaller so as to facilitate edge swiping, whereas the region determination unit 123 sets the operation start region smaller as the scrollable amount becomes larger so as to facilitate swiping. The region determination unit 123 may hold data of the operation start region that is set depending on the scrollable amount as a table in advance, or may calculate a perpendicular distance from the end of the screen using a mathematical expression, to set the operation start region. The region determination unit 123 may modify the operation start region depending on whether the image is an unscrollable image or an image that has been scrolled to the maximum extent possible and cannot be scrolled. For example, when the image is an unscrollable image, the user has no possibility of scrolling the image. Thus, the region determination unit 123 sets the operation start region larger so as to facilitate edge swiping. Therefore, in the case of an unscrollable image, the scrollable amount may be set to a value that can be distinguished from a normal scrollable amount, e.g., "−1".

Figure 4D:
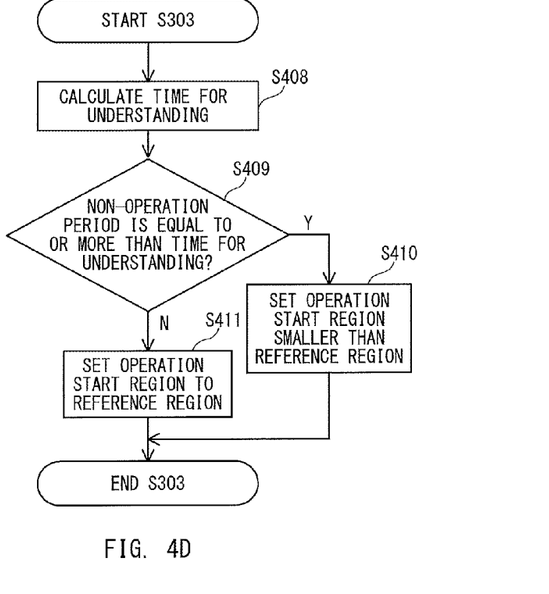

FIG. 4D is a flowchart for illustrating processing of determining the operation start region such that the user can easily scroll an image when understanding the content.

In the processing of FIG. 3, the operation status acquisition unit 121 acquires a period of time elapsed since the user has completed an operation as the operation status information (Step S301). For example, the operation status acquisition unit 121 holds a time at which the user has completed an operation last time, and acquires a period of time elapsed from that time to the current time. The display state acquisition unit 122 acquires the information quantity of displayed content as the display state information (Step S302). For example, the display state acquisition unit 122 acquires, for example, the number of characters displayed on the screen, and the number and sizes of images displayed on the screen, as the information quantity of the content.

The region determination unit 123 calculates a period of time necessary for the user to understand the content based on the information quantity of the content acquired by the display state acquisition unit 122 (Step S408). The region determination unit 123 holds a table in which a period of time necessary for the user to understand each content is set, for example, 0.1 second for one character, 0.2 second for a small image, and 0.3 second for a large image. The region determination unit 123 refers to the table, applies those periods of time to all the displayed contents, and calculates the period of time necessary for the user to understand the contents.

The region determination unit 123 determines whether or not the period of time elapsed since the user has completed an operation acquired by the operation status acquisition unit 121 is equal to or more than the period of time necessary for the user to understand the content (Step S409). When the period of time elapsed since the user has completed an operation is equal to or more than the period of time necessary for the user to understand the content (Step S409: Y), the region determination unit 123 sets the operation start region smaller than the reference region (Step S410). The processing of the region determination unit 123 is the same as the processing of Step S402, but the processing may be carried out in any manner as long as the operation start region can be set smaller than the reference region. When the period of time elapsed since the user has completed an operation is less than the period of time necessary for the user to understand the content (Step S409: N), the region determination unit 123 sets the operation start region to the reference region (Step S411).

The region determination unit 123 may return the operation start region to the reference region when the period of time since the user has completed an operation is more than the period of time necessary for the user to understand the content by a certain amount or more. This is because whether or not the user is likely to scroll an image cannot be determined after no operation is performed for a long period of time.

Figure 5A:
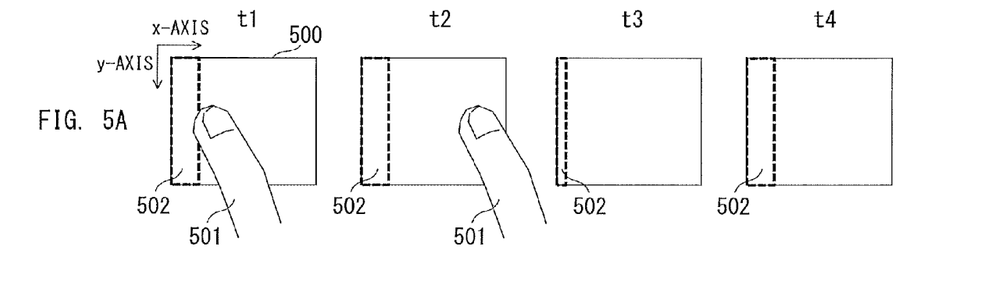
FIG. 5A, FIG. 5B, FIG. 5C, and FIG. 5D are explanatory diagrams for illustrating processing of determining the operation start region.
Figure 5B:
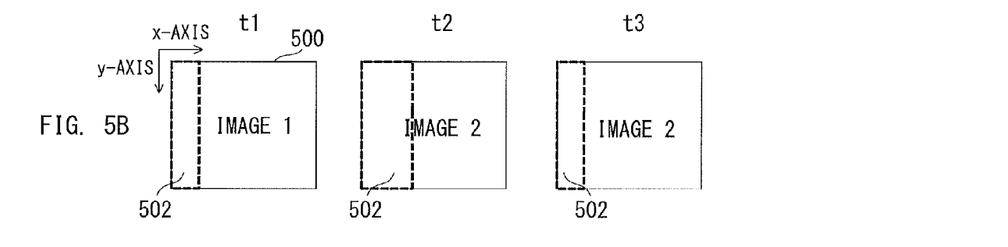
Figure 5C:
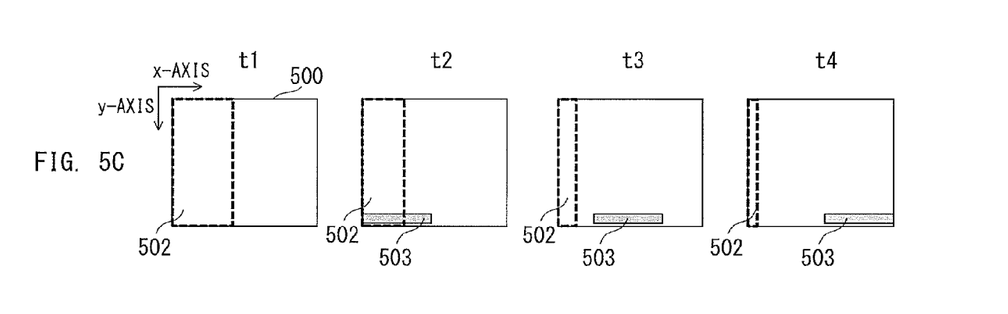
Figure 5D:
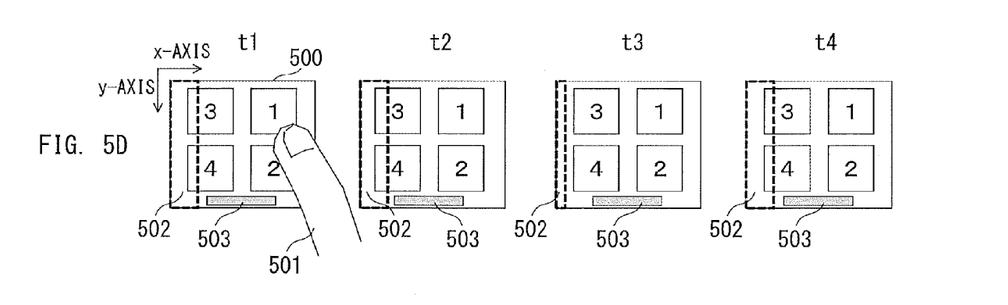

Now, a description is given of a specific operation example of the information processing apparatus 100 with reference to FIG. 3, FIG. 4A to FIG. 4D, and FIG. 5A to FIG. 5D. FIG. 5A to FIG. 5D are each an explanatory diagram for illustrating processing of determining the operation start region. An input/output unit 500 is the touch panel 111. The input/output unit 500 sets the lateral direction of FIG. 5A to FIG. 5D as an x-axis, and the longitudinal direction as a y-axis. The input surface of the input/output unit 500 may be an entire surface of the touch sensor 107, or a part thereof. A finger 501 of the user, which is a pointer, inputs an instruction to the information processing apparatus 100 by the user performing a touch operation on the input surface of the input/output unit 500. In this embodiment, the operation start region 502 is placed at the left end portion of the input surface in the figures. A scroll bar 503 indicates the scrollable amount of a displayed image by length, and indicates in which direction the displayed image can be scrolled by position. In FIG. 5C and FIG. 5D, the scroll bar 503 is displayed at the bottom of the screen in order to describe an example of scrolling in left and right directions.

FIG. 5A is an explanatory diagram corresponding to the processing of FIG. 4A, and represents processing of setting the operation start region such that the user can easily perform swiping immediately after scrolling an image.

At a time t1, the user swipes the input surface with the finger 501 in order to perform scrolling on the input/output unit 500. At this time, the operation start region 502 is set to the reference region. The information processing apparatus 100 starts the processing of the flowchart of FIG. 3 because a change in operation status, which is the start of a touch operation with the finger 501, is detected. The operation status acquisition unit 121 acquires the touch operation start status as the latest operation status information after the change (Step S301). At this time, the operation status acquisition unit 121 holds a current touch position, which is located outside the operation start region, as the touch start position. The display state acquisition unit 122 does not perform any processing. The region determination unit 123 does not perform any processing because the user has not scrolled the image yet (Step S401: N) and the operation start region has already been set to the reference region (Step S403).

At a time t2, the user swipes the input surface of the input/output unit 500 with the finger 501 in the right direction. The information processing apparatus 100 starts the processing of the flowchart of FIG. 3 because the change in operation status, which is the continuation of the touch operation with the finger 501, is detected. The information processing apparatus 100 determines the touch operation as swiping because the touch start position held at the time t1 is located outside the operation start region 502 (refer to FIG. 2). The operation status acquisition unit 121 acquires swiping, that is, the operation status representing that the user has performed scrolling, as the latest operation status information after the change (Step S301). The display state acquisition unit 122 does not perform any processing. The region determination unit 123 performs the same processing as that at the time t1 because the user has not completed the scroll operation (Step S401: N, Step S403).

At a time t3, the user finishes swiping and takes the finger 501 off the input surface. The information processing apparatus 100 starts the processing of the flowchart of FIG. 3 because the change in operation status, which is the completion of the touch operation, is detected. The operation status acquisition unit 121 holds the current time, which is a time at which the user has scrolled an image, as the latest operation status information after the change in response to completion of swiping (scrolling) (Step S301). Further, the operation status acquisition unit 121 acquires the period of time elapsed since the user has scrolled an image as the operation status information. The display state acquisition unit 122 does not perform any processing.

The region determination unit 123 determines whether or not the period of time elapsed since the user has scrolled an image, which is acquired as the operation status information, is equal to or less than the threshold period (Step S401). This threshold period is determined based on, for example, a period of time until the user scrolls an image next when the user continuously scrolls the image. In this embodiment, for example, the threshold period is set to 1 second. At the time t3, only a little period of time has passed since the user has scrolled an image (Step S401: Y). Thus, the region determination unit 123 sets the operation start region 502 smaller than the reference region (Step S402). In this example, the operation start region 502 is set thinner than the reference region.

The processing at the time t3 is repeatedly executed until the period of time elapsed since the user has scrolled an image reaches 1 second, which is the threshold period. In this manner, the information processing apparatus 100 sets the operation start region smaller so as to facilitate scrolling because the user is likely to continuously scroll (swipe) an image within a predetermined period of time since the user has scrolled the image.

At a time t4, the user finishes swiping and the threshold period (1 second) or more has passed. The information processing apparatus 100 starts the processing of the flowchart of FIG. 3 because the change in operation status, which is the passage of the threshold period or more since the user has completed the touch operation, is detected. The operation status acquisition unit 121 acquires the period of time elapsed since the user has scrolled an image as the latest operation status information after the change (Step S301). In this case, the elapsed period of time is assumed to be 1.1 seconds. The display state acquisition unit 122 does not perform any processing.

The region determination unit 123 determines whether or not the period of time elapsed since the user has scrolled an image (1.1 seconds), which is acquired as the operation status information, is equal to or less than the threshold period (1 second) (Step S401). The elapsed period of time is longer than the threshold period (Step S401: N), and thus the region determination unit 123 returns the operation start region to the reference region (Step S403).

In this manner, the information processing apparatus 100 sets the operation start region smaller than the reference region such that the user can easily perform swiping immediately after scrolling an image. Therefore, the user can easily scroll an image again after scrolling the image.

FIG. 5B is an explanatory diagram corresponding to the processing of FIG. 4B, and represents processing of setting the operation start region such that the user can easily perform edge swiping immediately after the image has transitioned.

At the time t1, an "image 1" is displayed on the display screen of the input/output unit 500, and the operation start region 502 is set to the reference region. At this time, the operation status of the user and the display state of the screen are not changed, and thus the information processing apparatus 100 does not perform any processing.

At the time t2, the "image 1" transitions to an "image 2" for display on the display screen of the input/output unit 500. The information processing apparatus 100 starts the processing of the flowchart of FIG. 3 because the change in display state, which is the image transition, is detected. On the other hand, the operation status acquisition unit 121 does not perform any processing because there is no change in operation status. The display state acquisition unit 122 acquires the image transition status as the display state information (Step S302). The display state acquisition unit 122 holds a time at which the image transition is complete, and acquires a period of time elapsed since the image transition has been completed as the display state information.

The region determination unit 123 determines whether or not the period of time elapsed since the image transition has been completed is equal to or less than a threshold period (Step S404). The threshold period is set to, for example, 1 second as a period of time for, for example, returning to the previous image after transitioning to a wrong image. At the time t2, only a little period of time has passed since the image transition has been completed, and thus the elapsed period of time is equal to or less than the threshold period (Step S404: Y). In this case, the region determination unit 123 sets the operation start region 502 larger than the reference region (Step S405).

The processing at the time t2 is repeatedly executed until the period of time elapsed since the image transition has been completed reaches 1 second or more, which is the threshold period. In this manner, the information processing apparatus 100 sets the operation start region larger so as to facilitate edge swiping because the user is likely to return to the previous image when transitioning to and swiping a wrong image before understanding the content.

At the time t3, the threshold period (1 second) or more has passed since the "image 1" has transitioned to the "image 2" for display on the display screen of the input/output unit 500. The information processing apparatus 100 starts the processing of the flowchart of FIG. 3 because the change in operation status, which is the passage of the threshold period or more since the image transition has been completed, is detected. There is no change in operation status, and thus the operation status acquisition unit 121 does not perform any processing. The display state acquisition unit 122 acquires the period of time elapsed since the image transition has been completed as the display state information (Step S302). In this case, the elapsed period of time is assumed to be 1.1 seconds.

The region determination unit 123 determines whether or not the period of time elapsed since the image transition has been completed (1.1 seconds), which is acquired as the display state information, is equal to or less than the threshold period (1 second) (Step S404). The elapsed period of time is longer than the threshold period (Step S401: N), and thus the region determination unit 123 returns the operation start region to the reference region (Step S406).

In this manner, the information processing apparatus 100 sets the operation start region larger than the reference region such that the user can easily perform edge swiping immediately after the image has transitioned. As a result, the user can easily perform edge swiping for returning to the previous image when transitioning to a wrong image.

FIG. 5C is an explanatory diagram corresponding to the processing of FIG. 4C, and represents processing of setting the operation start region so as to facilitate edge swiping when the scrollable amount of an image is small and to facilitate swiping when the scrollable amount of an image is large.

At the time t1, an unscrollable image is displayed on the display screen of the input/output unit 500. The information processing apparatus 100 starts processing of the flowchart of FIG. 3 because the change in display state, which is the display of the unscrollable image, is detected. The operation status acquisition unit 121 does not perform any processing. The display state acquisition unit 122 acquires the scrollable amount of "−1" representing that an unscrollable image is displayed as the display state information (Step S302). The region determination unit 123 sets the operation start region 502 to be the largest based on the scrollable amount of "−1" acquired as the display state information (Step S407). The operation start region 502 is maintained until the display state of the image is changed.

At the time t2, an image that is scrollable but has reached the scroll limit so that the image can no longer be scrolled in the right direction is displayed on the display screen of the input/output unit 500. The information processing apparatus 100 starts the processing of the flowchart of FIG. 3 because the change in display state, which is the display of the image that has reached the scroll limit, is detected. The operation status acquisition unit 121 does not perform any processing. The display state acquisition unit 122 acquires the scrollable amount of "0" representing that the image has reached the scroll limit as the display state information (Step S302). The region determination unit 123 sets the operation start region 502 larger than the reference region based on the scrollable amount of "0" acquired as the display state information (Step S407). The operation start region 502 is maintained until the display state of the image is changed.

At the time t3, an image having a small scrollable amount is displayed on the display screen of the input/output unit 500. The information processing apparatus 100 starts the processing of the flowchart of FIG. 3 because the change in display state, which is the display of the image having a small scrollable amount, is detected. The operation status acquisition unit 121 does not perform any processing. The display state acquisition unit 122 acquires a scrollable amount, for example, "50" as the display state information (Step S302). In this embodiment, the scrollable amount is represented in units of dots, which are the resolution of a screen. However, dots may be rounded by mathematical expressions to be used, or the scrollable distance may actually be measured and represented in other units, e.g., millimeters. The region determination unit 123 sets the operation start region 502 smaller than the reference region based on the scrollable amount of "50" (Step S407). The operation start region 502 is maintained until the display state of the image is changed.

At the time t4, an image having a large scrollable amount is displayed on the display screen of the input/output unit 500. The information processing apparatus 100 starts the processing of the flowchart of FIG. 3 because the change in display state, which is the display of the image having a large scrollable amount, is detected. The operation status acquisition unit 121 does not perform any processing. The display state acquisition unit 122 acquires a scrollable amount, for example, "100" as the display state information (Step S302). The region determination unit 123 sets the operation start region 502 smaller than the reference region based on the scrollable amount of "100" (Step S407). The scrollable amount at the time t4 is larger than that at the time t3, and thus the operation start region 502 at the time t4 is smaller than that at the time t3. The operation start region 502 is maintained until the display state of the image is changed.

In this manner, the information processing apparatus 100 sets the operation start region larger than the reference region so as to facilitate edge swiping because, when the image is unscrollable or has reached the scroll limit, the user is likely not to scroll the image and to return to the previous image. When the image is scrollable, the information processing apparatus 100 sets the operation start region based on the scrollable amount. A larger scrollable amount means a high possibility of the user scrolling (swiping) the image by a larger amount. Therefore, the information processing apparatus 100 sets the operation start region smaller so as to facilitate swiping.

FIG. 5D is an explanatory diagram corresponding to the processing of FIG. 4D, and represents processing of calculating a period of time necessary for the user to understand content based on the information quantity of the displayed content and setting the operation start region based on the calculated period of time. When the period of time for understanding the content has passed, the operation start region is set so as to facilitate swiping.

At the time t1, the user is scrolling an image, and the operation start region 502 is set to the reference region. Although the change in operation status, which is scrolling in action, is detected, the information processing apparatus 100 does not perform any processing at this timing in this example.

At the time t2, the user has finished scrolling the image. The information processing apparatus 100 starts the processing of the flowchart of FIG. 3 because the change in operation status, which is the completion of the user's operation, is detected. The operation status acquisition unit 121 holds the current time, which is a time at which the user has completed the operation, and acquires a period of time elapsed since the user has completed the operation (non-operation period) as the latest operation status information after the change (Step S301). The display state acquisition unit 122 acquires the information quantity of the displayed content as the display state information (Step S302). In FIG. 5D, four large images are displayed, and the display state acquisition unit 122 acquires this information as the information quantity of the content.

The region determination unit 123 calculates the period of time necessary for the user to understand the content based on the information quantity of the content acquired by the display state acquisition unit 122 (Step S408). In this case, four large images are displayed, and the period of time necessary for the user to understand the content is 1.2 seconds, which is four times 0.3 second. The region determination unit 123 determines whether or not the non-operation period acquired by the operation status acquisition unit 121 is equal to or more than the period of time necessary for the user to understand the content (1.2 seconds) (Step S409). The time t2 is when the user has just completed the operation, and thus the non-operation period has not reached the period of time necessary for the user to understand the content (Step S409: N). Thus, the region determination unit 123 sets the operation start region to the reference region (Step S411). At the time t2, the region determination unit 123 does not need to perform processing of setting the operation start region because the operation start region has already been set to the reference region at the time t1.

At the time t3, the period of time necessary for the user to understand the content after the user has scrolled the image or more has passed. The information processing apparatus 100 starts the processing of the flowchart of FIG. 3 because the change in operation status, which is the passage of the period of time necessary for the user to understand the content (1.2 seconds) or more by the non-operation period, is detected. The operation status acquisition unit 121 acquires the non-operation period (e.g., 1.3 seconds) as the latest operation status information after the change (Step S301). The display state acquisition unit 122 does not acquire the latest display state information because there is no change in the display of the image.

The region determination unit 123 calculates the period of time necessary for the user to understand the content (1.2 seconds) with the same display state information as that at the time t2 because the display state acquisition unit 122 does not acquire the latest display state information (Step S408). In this case, the region determination unit 123 may hold the period of time calculated at the previous processing, and set the held period of time as the period of time necessary for the user to understand the content when the latest display state information is not acquired. The region determination unit 123 determines whether or not the non-operation period acquired by the operation status acquisition unit 121 is equal to or more than the period of time necessary for the user to understand the content (1.2 seconds) (Step S409). At the time t3, the non-operation period is "1.3 seconds", and thus the region determination unit 123 determines that the period of time necessary for the user to understand the content or more has passed (Step S409: Y). Thus, the region determination unit 123 sets the operation start region smaller than the reference region (Step S410). As a result, the operation start region 502 is placed so as to be smaller than the reference region in the x-axis direction as illustrated in FIG. 5D at the time t3. In this manner, when there is no operation during the period of time necessary for the user to understand the content, the information processing apparatus 100 determines that the user is likely to have checked the content and scroll (swipe) the image to check the next content. Therefore, the information processing apparatus 100 sets the operation start region 502 smaller so as to facilitate swiping.

The information processing apparatus 100 may maintain the operation start region after the time t3. However, in this embodiment, the information processing apparatus 100 returns the operation start region to the reference region after a predetermined period of time (e.g., 10 seconds) elapses additionally. The time t4 represents a state in which a period of time (12 seconds) that is equal to or more than the predetermined period of time has elapsed since the time t3. The period of time (12 seconds) that is equal to or more than the predetermined period of time (10 seconds) has elapsed in addition to the period of time necessary for the user to understand the content (1.2 seconds), and thus the region determination unit 123 sets the operation start region to the reference region.

The information processing apparatus 100 cannot determine whether or not the user is likely to perform swiping when the user does not perform any operation for a long period of time after understanding the content, and thus returns the operation start region to the reference region after the predetermined period of time has elapsed. In this embodiment, a description is given on the assumption that the predetermined period of time is 10 seconds. However, the predetermined period of time is not limited thereto, and may be varied depending on the period of time necessary for the user to understand the content. For example, when the period of time necessary for the user to understand the content is long, an error in time until the user finishes checking the content is large, resulting in the longer predetermined period of time.

As described above, the information processing apparatus 100 in this embodiment can determine the operation start region for determining edge swiping based on the operation status of the user and the display state of an image. As a result, the user can easily scroll the image or return to the previous image in accordance with his or her intention, and the operability is therefore improved.

The information processing apparatus 100 may set the operation start region using two or more of the various setting conditions of the operation start region in combination, which are illustrated in FIG. 4A to FIG. 4D. Now, a description is given of processing of determining the operation start region using all the region setting conditions in combination with reference to FIG. 6.

Figure 6:
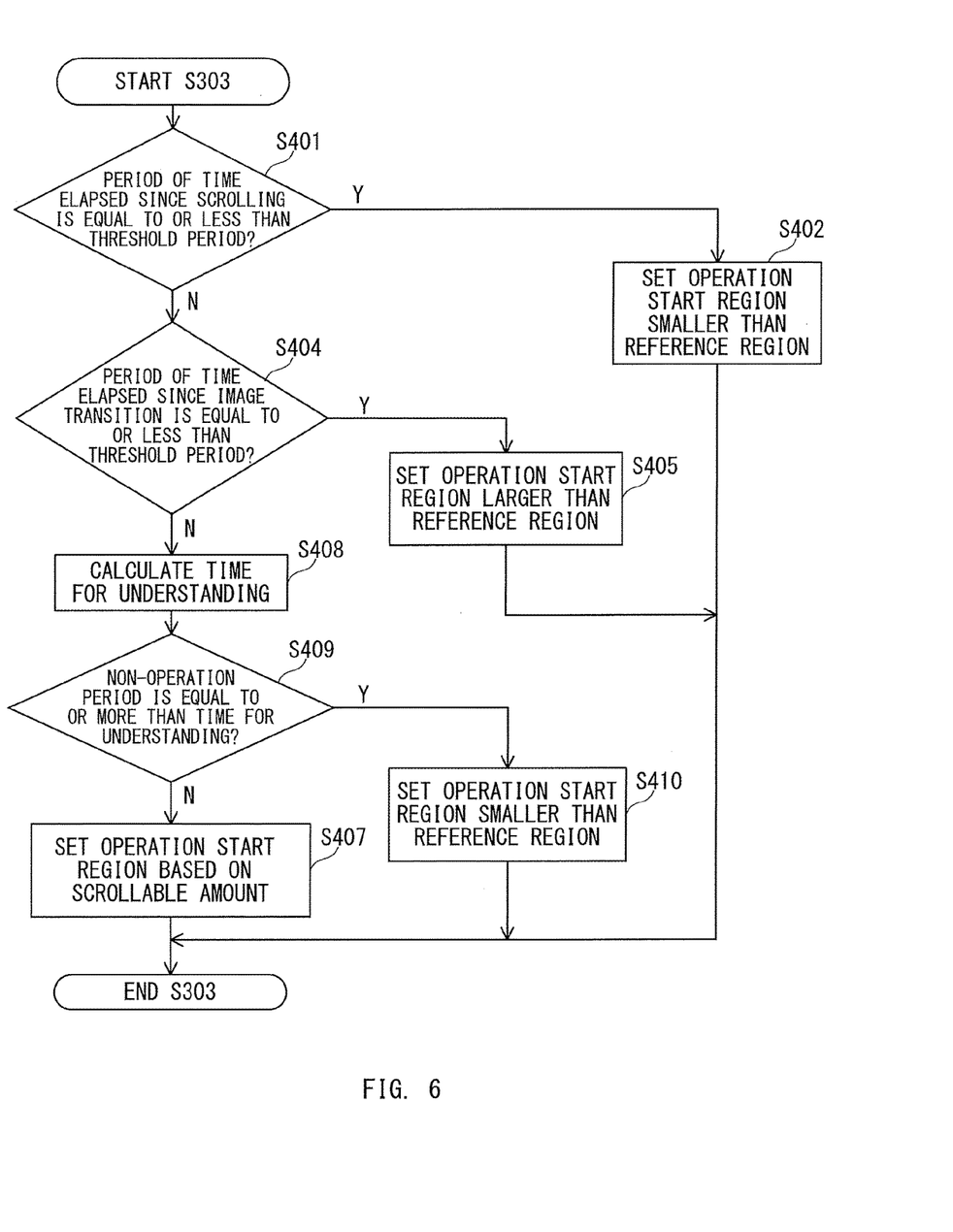
FIG. 6 is a flowchart for illustrating processing of determining the operation start region.

FIG. 6 is a flowchart for illustrating processing of determining the operation start region. Processing of each step has been described with reference to FIG. 4A to FIG. 4D, and thus details thereof are omitted here. In FIG. 6, the information processing apparatus 100 performs the operation start region setting processing in order of FIG. 4A, FIG. 4B, FIG. 4D, and FIG. 4C. In FIG. 6, among the various setting conditions of the operation start region illustrated in FIG. 4A to FIG. 4D, a condition whose determination is executed first is prioritized in setting of the operation start region. Therefore, a condition that is desired to be reflected by the user may be set in advance to be determined first.

Figure 7A:
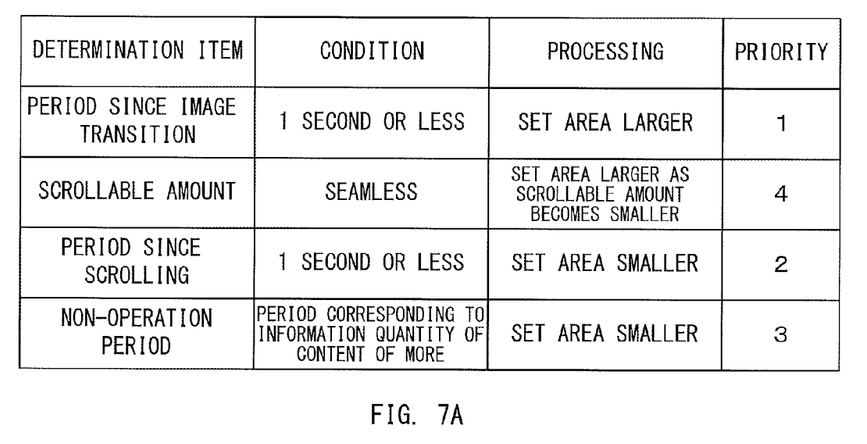
FIG. 7A and FIG. 7B are exemplary tables for showing conditions of setting the operation start region.
Figure 7B:
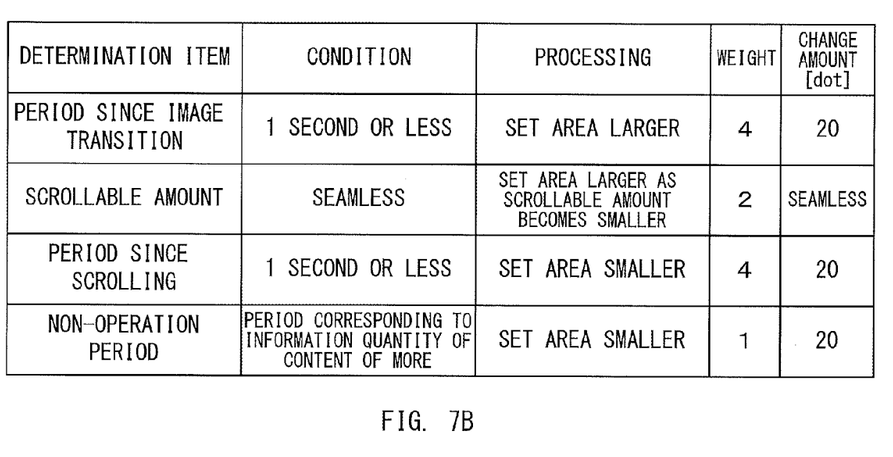

FIG. 7A and FIG. 7B are each an exemplary table for showing conditions of setting the operation start region. The information processing apparatus 100 holds the tables shown in FIG. 7A and FIG. 7B in the ROM 102, the RAM 103, or the external storage device 109 in advance, and sets the operation start region by referring to the tables as necessary.

FIG. 7A is an exemplary table for setting a priority for each setting condition of the operation start region. The information processing apparatus 100 determines the region setting condition in accordance with the priority. This table is rewritable, and the user can specify the setting condition of the operation start region in accordance with his or her desired priority. Further, the information processing apparatus 100 may learn the operation of the user to change the priority of the setting condition of the operation start region. In the example of FIG. 7A, the processing of FIG. 4B is set to be prioritized highest, whereas the processing of FIG. 4C is set to be prioritized lowest.

Through use of those tables, when a plurality of setting conditions of the operation start region are satisfied at the same time, a setting condition having a high priority is prioritized and the operation start region is set in accordance with the condition desired by the user. Therefore, the operability of edge swiping and swiping is improved in a manner that conforms to the intention of the user.

FIG. 7B is an exemplary table for weighting each setting condition of the operation start region and setting the change amount of the operation start region. The information processing apparatus 100 sets the operation start region in accordance with the change amount of the operation start region when a setting condition of the operation start region is satisfied.

For example, when an image containing large content is displayed after an image is scrolled, the information processing apparatus 100 calculates the period of time necessary for the user to understand the content (0.3 second) based on the information quantity of the content (Step S408 of FIG. 4D). At this time, when the non-operation period is equal to or more than 0.3 second, and 1 second or less has elapsed since the user has scrolled the image, two setting conditions are satisfied at the same time.

In this case, the information processing apparatus 100 sets the operation start region by shortening the perpendicular distance of the reference region from the end of the screen by 80 dots, which are obtained by multiplying a change amount "20 dots" by a weight "4", because the condition of the period of time since the user has scrolled an image is satisfied as shown in FIG. 7B. At the same time, the information processing apparatus 100 sets the operation start region by shortening the perpendicular distance of the reference region from the end of the screen by 20 dots, which are obtained by multiplying a change amount "20 dots" by a weight "1", because the condition of the non-operation period is also satisfied as shown in FIG. 7B.

As a result, the operation start region is set by shortening the perpendicular distance of the reference region from the end of the screen by 100 dots, which is a sum of 80 dots and 20 dots in total. In this manner, the operation start region can be set considering a plurality of setting conditions of the operation start region in combination, to thereby improve the accuracy of determining edge swiping and swiping.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-220567, filed Nov. 10, 2015 which is hereby incorporated by reference herein in its entirety.

What is claimed is:

1. An information processing apparatus, comprising:
one or more processors; and
a memory storing instructions that, when executed by the one or more processors, cause the information processing apparatus to:
detect a touch position on an input surface of a predetermined display touched with a predetermined pointer;
set a size of a specific region at an end portion of the input surface based on at least one of an operation status having been performed with the predetermined pointer and a display state of an image displayed on the predetermined display, wherein the specific region is not explicitly displayed in the predetermined display, and, even in a case where the size of the specific region is changed based on the operation status or the display state, the change in the specific region does not affect the image displayed on the predetermined display;
receive, depending on a start point of a linear locus of the touch position not being inside the specific region on the input surface, the linear locus of the touch position as a first operation and receive, depending on the start point of the linear locus of the touch position being inside the specific region on the input surface, the linear locus of the touch position as a second operation different from the first operation; and
change the display state of the image displayed on the predetermined display by reflecting the received first operation or second operation.

2. The information processing apparatus according to claim 1, wherein the instructions executed by the one or more processors further cause the information processing apparatus to
acquire operation status information representing the operation status based on the touch position acquired by the position detection unit at a predetermined time interval and a detection time of the touch position; and
acquire display state information representing the display state of the image that is displayed on the predetermined display,
wherein the size of the specific region is set based on at least one of the operation status information and the display state information.

3. The information processing apparatus according to claim 2, wherein the acquired operation status information includes at least one of a period of time since an operation with use of the predetermined pointer has been completed and a period of time during which an operation with use of the predetermined pointer is not performed.

4. The information processing apparatus according to claim 2, wherein the acquired display state information includes at least one of a period of time since an image that is displayed on the predetermined display has transitioned to a new image for display and an information quantity of content contained in a displayed image.

5. The information processing apparatus according to claim 1,
wherein the input surface comprises at least a part of a display screen of the predetermined display,
wherein the instructions executed by the one or more processors further cause the information processing apparatus to determine a position of the specific region as an end portion of the display screen of the predetermined display, and
wherein the linear locus of the touch position is received as the second operation in a case where the linear locus of the touch position on the input surface starts from inside the specific region toward an inner side of the input surface.

6. The information processing apparatus according to claim 1, wherein a priority is set for each of the operation status and the display state, and the size of the specific region is set in accordance with the priority.

7. The information processing apparatus according to claim 1, wherein each of the operation status and the display state is weighted, and the size of the specific region is set in accordance with the weight.

8. The information processing apparatus according to claim 1, wherein the size of the specific region is set to correspond to a reference region defined in advance, in a case where a period of time elapsed since the image has been scrolled is more than a predetermined threshold period, and the size of the specific region is set to correspond to a region different from the reference region, in a case where the period of time is equal to or less than the predetermined threshold period.

9. The information processing apparatus according to claim 8, wherein the size of the specific region is set to be smaller than the reference region, in a case where the period of time is equal to or less than the predetermined threshold period.

10. The information processing apparatus according to claim 8, wherein a shape of the specific region is set to be different from a shape of the reference region, in a case where the period of time is equal to or less than the predetermined threshold period.

11. The information processing apparatus according to claim 1, wherein the specific region is dynamically deformed depending on a period of time elapsed since the image has been scrolled, and an operation start region is set to be smaller as the period of time elapsed since the image has been scrolled becomes shorter.

12. The information processing apparatus according to claim 1, wherein the size of the specific region is set to correspond to a reference region defined in advance, in a case where a period of time elapsed since an image that is displayed on the predetermined display has transitioned is more than a predetermined threshold period, and the size of the specific region is set to correspond to a region larger than the reference region, in a case where the period of time is equal to or less than the predetermined threshold period.

13. The information processing apparatus according to claim 1, wherein the size of the specific region is changed based on a scrollable amount by which an image that is displayed on the predetermined display is capable of being scrolled and the size of the specific region is set larger as the scrollable amount by which an image that is displayed on the predetermined display is capable of being scrolled becomes smaller.

14. The information processing apparatus according to claim 1, wherein the size of the specific region is changed based on a comparison between a period of time elapsed since an operation has been performed on the input surface last time and a period of time necessary for a user to understand content contained in the image.

15. The information processing apparatus according to claim 14, wherein the size of the specific region is set to correspond to a reference region defined in advance, in a case where the period of time elapsed since an operation has been performed on the input surface last time is less than the period of time necessary for a user to understand content contained in the image, and the size of the specific region is set to correspond to a region smaller than the reference region, in a case where the period of time is equal to or more than the period of time necessary for a user to understand content contained in the image.

16. The information processing apparatus according to claim 1,
wherein the first operation is an instruction for scrolling the image being displayed on the predetermined display.

17. The information processing apparatus according to claim 1,
wherein the first operation is an instruction for scrolling the image being displayed on the predetermined display, and the second operation is an instruction for changing the image being displayed on the predetermined display to a different image.

18. The information processing apparatus according to claim 1,
wherein the first operation is an instruction for scrolling the image being displayed on the predetermined display, and the second operation is an instruction for changing the image being displayed on the predetermined display to return to an image previously displayed.

19. An operation determination method, which is executed by an information processing apparatus that detects a touch position on an input surface of a predetermined display touched with a predetermined pointer, the operation determination method comprising:
setting a size of specific region at an end portion of the input surface based on at least one of an operation status having been performed with the predetermined pointer and a display state of an image displayed on the predetermined display, wherein the specific region is not explicitly displayed in the predetermined display, and, even in a case where the size of the specific region is changed based on the operation status or the display state, the change in the specific region does not affect the image displayed on the predetermined display;
receiving, depending on a start point of a linear locus of the touch position not being inside the specific region, the linear locus of the touch position as a first operation;
receiving, depending on the start point of the linear locus of the touch position being inside the specific region on the input surface, the linear locus of the touch position as a second operation different from the first operation on the image; and
changing the display state of the image having been displayed on the predetermined display by reflecting the first operation or the second operation.

20. A non-transitory computer-readable storage medium having stored thereon a computer program for causing a computer that detects a touch position on an input surface of a predetermined display touched with a predetermined pointer to:
set a size of a specific region at an end portion of the input surface based on at least one of an operation status having been performed with the predetermined pointer and a display state of an image displayed on the predetermined display, wherein the specific region is not explicitly displayed in the predetermined display, and, even in a case where the size of the specific region is changed based on the operation status or the display state, the change in the specific region does not affect the image displayed on the predetermined display;
receive, depending on a start point of a linear locus of the touch position not being inside the specific region on the input surface, the linear locus of the touch position as a first operation and receive, depending on the start point of the linear locus of the touch position being inside the specific region on the input surface, the linear locus of the touch position as a second operation different from the first operation; and
change the display state of the image displayed on the predetermined display by reflecting the received first operation or second operation.

* * * * *